US012251354B2

(12) United States Patent
Belinkov

(10) Patent No.: US 12,251,354 B2
(45) Date of Patent: Mar. 18, 2025

(54) DEVICES, SYSTEMS AND METHODS FOR PRESSURE DETECTION IN AN EXOSKELETON SYSTEM

(71) Applicant: Lifeward Ltd., Yokneam (IL)

(72) Inventor: Gadi Belinkov, Yokneam Illit (IL)

(73) Assignee: Lifeward Ltd., Yokneam Illit (IL)

( * ) Notice: Subject to any disclaimer, the term of this patent is extended or adjusted under 35 U.S.C. 154(b) by 0 days.

(21) Appl. No.: 16/339,959

(22) PCT Filed: Oct. 7, 2017

(86) PCT No.: PCT/IB2017/056207
§ 371 (c)(1),
(2) Date: Apr. 5, 2019

(87) PCT Pub. No.: WO2018/065967
PCT Pub. Date: Apr. 12, 2018

(65) Prior Publication Data

US 2019/0282428 A1 Sep. 19, 2019

Related U.S. Application Data

(60) Provisional application No. 62/405,719, filed on Oct. 7, 2016.

(51) Int. Cl.
*A61H 3/00* (2006.01)

(52) U.S. Cl.
CPC ......... *A61H 3/00* (2013.01); *A61H 2003/007* (2013.01); *A61H 2201/018* (2013.01);
(Continued)

(58) Field of Classification Search
CPC .................. A61H 3/00; A61H 2201/50; A61H 2201/5074; A61H 2201/018;
(Continued)

(56) References Cited

U.S. PATENT DOCUMENTS 7,153,242 B2 12/2006 Goffer
8,905,955 B2 * 12/2014 Goffer .................. A61H 1/0255 602/16

(Continued)

FOREIGN PATENT DOCUMENTS

CN 101489732 A 7/2009
JP 2010253048 A * 11/2010

OTHER PUBLICATIONS

International Search Report and Written Opinion mailed on Feb. 20, 2018, for International Application No. PCT/IB2017/056207, 8 pages.

*Primary Examiner* — Tu A Vo
*Assistant Examiner* — Kelsey E Baller
(74) *Attorney, Agent, or Firm* — COOLEY LLP

(57) ABSTRACT

Devices, systems and methods are presented for providing safety functionality in an exoskeleton system. In particular, some embodiments make use of a sensor system and methodology with/for an exoskeleton apparatus to facilitate such safety functionality. For example, a system for regulating a load amount applied on a user of an exoskeleton may comprise one or more sensors for sensing data related to an amount of force exerted at a limb of the user by apart of the exoskeleton; a communications component for transmitting the sensed data to a processing unit operably coupled to the exoskeleton; and the processing unit configured to process the data so as to determine the amount of exerted force and generate an instruction to trigger a mode of operation of the exoskeleton based on the determined amount of force.

10 Claims, 3 Drawing Sheets

(52) U.S. Cl.
CPC ................ *A61H 2201/1642* (2013.01); *A61H 2201/165* (2013.01); *A61H 2201/50* (2013.01); *A61H 2201/501* (2013.01); *A61H 2201/5071* (2013.01); *A61H 2201/5074* (2013.01); *A61H 2201/5097* (2013.01)

(58) Field of Classification Search
CPC ...... A61H 2201/1642; A61H 2201/165; A61H 2201/501; A61H 2201/5071; A61H 2201/5097; A61H 2003/007; A61H 1/0237; B25J 9/0006; B25J 9/16
See application file for complete search history.

(56) References Cited

U.S. PATENT DOCUMENTS

| | | | | |
|---|---|---|---|---|
| 9,387,588 | B1 * | 7/2016 | Blankespoor | B25J 9/1692 |
| 10,342,725 | B2 * | 7/2019 | Yue | A61H 3/00 |
| 10,350,091 | B2 * | 7/2019 | Ha | A61F 2/605 |
| 2005/0209049 | A1 * | 9/2005 | Shields | A63B 23/0405 482/8 |
| 2006/0276728 | A1 * | 12/2006 | Ashihara | A61H 1/0262 601/5 |
| 2007/0155588 | A1 | 7/2007 | Stark et al. | |
| 2008/0009771 | A1 * | 1/2008 | Perry | A61H 1/0281 600/587 |
| 2009/0210093 | A1 * | 8/2009 | Jacobsen | A61H 3/008 700/260 |
| 2010/0094188 | A1 * | 4/2010 | Goffer | A61H 1/0255 600/587 |
| 2010/0271051 | A1 * | 10/2010 | Sankai | A61H 1/0262 324/679 |
| 2012/0101415 | A1 * | 4/2012 | Goffer | A61H 1/024 601/35 |
| 2013/0253385 | A1 | 9/2013 | Goffer et al. | |
| 2014/0005577 | A1 | 1/2014 | Goffer | |
| 2014/0196757 | A1 | 7/2014 | Goffer | |
| 2014/0212243 | A1 * | 7/2014 | Yagi | A61H 1/024 414/2 |
| 2015/0088269 | A1 * | 3/2015 | Roh | A61F 2/72 623/25 |
| 2015/0134079 | A1 | 5/2015 | Yoon et al. | |
| 2015/0272807 | A1 | 10/2015 | Gupta et al. | |
| 2015/0272811 | A1 * | 10/2015 | Choi | B25J 9/0006 623/27 |
| 2016/0008206 | A1 | 1/2016 | Devanaboyina | |
| 2016/0030272 | A1 * | 2/2016 | Angold | A61F 2/70 623/24 |
| 2016/0150999 | A1 * | 6/2016 | Sugata | A61F 2/70 600/587 |
| 2016/0250093 | A1 * | 9/2016 | Koren | A61H 1/0244 623/30 |
| 2017/0128291 | A1 * | 5/2017 | Kim | A61H 1/0244 |
| 2017/0252255 | A1 * | 9/2017 | Asano | B25J 9/163 |
| 2018/0257216 | A1 | 9/2018 | Shavit | |
| 2018/0296426 | A1 | 10/2018 | Kappel | |
| 2018/0304456 | A1 * | 10/2018 | Gunura | A61F 5/0125 |
| 2019/0183714 | A1 * | 6/2019 | Goto | A61H 1/00 |
| 2020/0281802 | A1 | 9/2020 | Rabkin | |
| 2020/0346009 | A1 * | 11/2020 | Murray | A61N 1/36031 |
| 2021/0236375 | A1 | 8/2021 | Goffer et al. | |

* cited by examiner

DEVICES, SYSTEMS AND METHODS FOR PRESSURE DETECTION IN AN EXOSKELETON SYSTEM

CROSS REFERENCE TO RELATED APPLICATIONS

This application is a U.S. national stage of PCT application no. PCT/IB2017/056207, having an international filing date of Oct. 7, 2017, which claims priority to U.S. Provisional Patent Application No. 62/405,719, entitled "Devices, Systems and Methods for Pressure Detection in an Exoskeleton System," filed Oct. 7, 2016, the entirety of each of the foregoing disclosures are incorporated herein by reference.

TECHNICAL FIELD

Embodiments of the present disclosure are directed to devices, systems and methods for providing safety functionality in an exoskeleton system. In particular, some embodiments make use of a sensor system and methodology with/for an exoskeleton apparatus to enable such safety functionality.

BACKGROUND

Various conditions contribute to the occurrence of disabilities in individuals that restrict or eliminate the individuals' capabilities for steady gait and/or movement, examples of which include neurological and physical injuries. Exoskeletons ("external skeletons") have been used to allow such individuals regain some or all of their capabilities to stand and/or move about with little or no additional support despite their disabilities.

SUMMARY OF SOME OF THE EMBODIMENTS

Embodiments of the present disclosure include a system for regulating a load amount applied on a user of an exoskeleton, the system comprising: one or more sensors for sensing data related to an amount of force exerted at a limb of the user by a part of the exoskeleton; and a communications component for transmitting the sensed data to a processing unit operably coupled to the exoskeleton; the processing unit configured to process the data so as to determine the amount of exerted force and generate an instruction to trigger a mode of operation of the exoskeleton based on the determined amount of force. In some embodiments, the one or more sensors can include a strain or pressure gauge. In some embodiments, the one or more sensors may include a sensor configured to measure an angle formed at a knee of the exoskeleton. Further, the noted part of the exoskeleton may be an anterior below knee support (ABKS) of the exoskeleton configured to provide support to a lower limb of a leg of the user.

In some embodiments, the processing unit may be configured to generate the instruction when the determined amount of force exceeds a predetermined threshold. In some embodiments, the predetermined threshold may depend on a weight of the user. Further, in some embodiments, the mode of operation of the exoskeleton may include a collapse mode where the exoskeleton lowers itself to a seated position or a ground. In some embodiments, the collapse mode may be a graceful or controlled collapse mode. In some embodiments, the system disclosed herein may include a user interface configured to provide a notification to the user prior to generating the trigger instruction.

In some embodiments, embodiments of the current disclosure include a method for regulating a load amount applied on a user of an exoskeleton, the method comprising the steps of receiving, from one or more sensors, data related to an amount of force exerted on a limb of the user by a part of the exoskeleton during a transition of the exoskeleton from seated to standing position; processing the data so as to determine the amount of force exerted on the limb of the user; generating an instruction to change an operation of the exoskeleton based on the determination of the amount of force; and transmitting the instruction to the exoskeleton device so as to change the operation of the exoskeleton. The method may also include the step of providing a warning to the user prior to transmitting the instruction to the exoskeleton device. In some embodiments, the data may include frictional force between a foot plate of the exoskeleton and a ground. Further, the data may include an angle formed at a knee of the exoskeleton during the transition between seating and standing positions. In addition, the data may include knee bent angle of the exoskeleton as during the transition.

BRIEF DESCRIPTION OF THE DRAWINGS

The principals and operations of the systems, apparatuses and methods according to some embodiments of the present disclosure may be better understood with reference to the drawings, and the following description. These drawings are given for illustrative purposes only and are not meant to be limiting.

DETAILED DESCRIPTION

The principals and operations of the systems, apparatuses and methods according to some embodiments of the present disclosure may be better understood with reference to the drawings, and the following description. These drawings are given for illustrative purposes only and are not meant to be limiting. Although amenable to various applications, specific embodiments are described herein, by way of example and not limitation, in order to illustrate the principles and features of the invention.

Figures 1A, 1B, 1C:
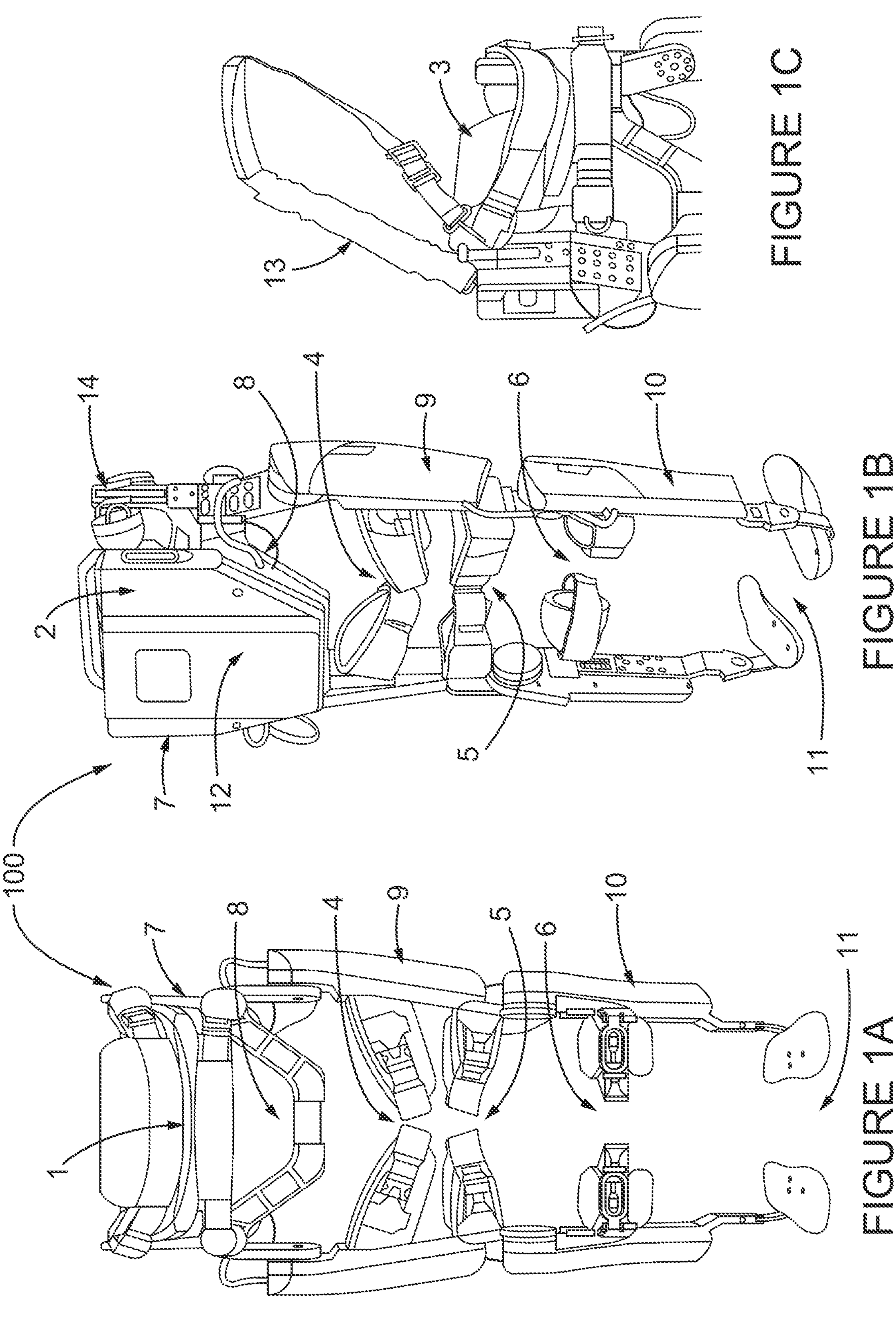
FIGS. 1A-B show example front view and back/perspective view of an exoskeleton device configured to allow disabled individuals (e.g., paraplegics) regain some or all of their stance and gait abilities, according to some embodiments.
FIG. 1C shows a perspective side/front view of straps for use in securing users to such exoskeletons devices, according to some embodiments.

With reference to FIGS. 1A-C, in some embodiments, an example exoskeleton device and associated accessories configured to allow disabled individuals (e.g., paraplegics) regain some or all of their stance and gait abilities are shown. The exoskeleton device 100 includes braces configured to provide support to the limbs of the user of the exoskeleton 100. For example, the exoskeleton 100 may include upper limb support 9 and lower limb support 10 that provide support to the upper (e.g., thigh) and lower (e.g., calf) portions of a user's leg, respectively. Further, the exoskeleton 100 may include a foot plate 11 to support the feet of the user when the exoskeleton is in use. In some embodiments, the exoskeleton 100 may also have components that provide support to the upper part or torso of a user's body. For example, the exoskeleton may comprise a back support that a user of the exoskeleton 100 can use to rest her/his back, such as the pad 1 (shown from front view) and 3 (shown from rear view). Also included is a pelvic support 8. In some embodiments, a user can be secured to some or all of these braces and supports via straps configured to allow a secure and comfortable attachment of the parts of the exoskeleton 100 to respective parts of the user's body. For example, thigh straps 4, above knee straps 5, and/or shoulder straps 13 can be included in the exoskeleton device 100 so as to provide secure connection between the exoskeleton 100 and the user. In some embodiments, there may also be a strap holder 14. In some embodiments, the exoskeleton 100 may also comprise an front knee bracket or anterior below knee support (ABKS) 6 that provides support to the leg of the user by abutting the front of the leg below the knee joint.

In some embodiments, the operation of the exoskeleton 100 may be controlled via a controller pack 12, which may incorporate a controller (e.g., in the form of a programmable processor), a memory, a communications component, a power source (e.g., battery), and/or the like. In some cases, the controller pack 12 can be worn on the back of a person using the exoskeleton 100, or the various components of the controller pack 12 may be attached to or incorporated in various components of the exoskeleton 100 such as the braces or supports 9, 10. In some embodiments, the controller pack 12 or components thereof may be external to the exoskeleton 100, and instructions for the operation of the exoskeleton 100 may be sent wirelessly to the exoskeleton device 100 (e.g., to a communications component onboard the exoskeleton 100).

In some embodiments, the exoskeleton 100 may include sensors 7 configured to gather data related to the stance and/or gait of the user/exoskeleton. In some embodiments, the sensors 7 may also measure environmental conditions such as temperature, etc. An example of sensors 7 that can be used for gathering stance/gait data includes a tilt sensor that measures, for example, the degree and/or the orientation of the tilt of the user/exoskeleton's torso. Another example of such sensors 7 includes a strain gauge or sensor that detects and measures the force or pressure exerted on one or more locations of the exoskeleton 100. For example, a strain gauge may be placed at contact points where limbs of the user's body and components of the exoskeleton 100 make contact, such as at braces, supports, straps, etc. Other examples include accelerometers, gyroscopes, and/or any other sensors. In some embodiments, the exoskeleton device 100 may include a power source such as a battery for powering the electronic components of the device. Such power sources may be rechargeable, and in such embodiments, the exoskeleton 100 may include a charging window 2 that allows one access to plug in an external power source to the power source (e.g., rechargeable battery) of the exoskeleton 100. In some embodiments, the exoskeleton 100 may also contain an on/off switch for activating/deactivating the exoskeleton 100 and/or its various components. For example, such a switch may be located in the vicinity of the charging window 2. Various aspects of the exoskeleton device have been described in the following applications and publications, all of which are incorporated by reference herein in their entireties:

U.S. Pat. No. 7,153,242, issued Dec. 26, 2006, filed May 24, 2001, and entitled "Gait-locomotor apparatus;"

U.S. Pat. No. 8,905,955, issued Dec. 9, 2014, filed Jan. 7, 2013, and entitled "Locomotion assisting device and method;"

US Patent Publication No. 2012/0101415, published Apr. 26, 2012, filed Oct. 21, 2010, and entitled "Locomotion Assisting Apparatus with Integrated Tilt Sensor;"

US Patent Publication No. 2013/0253385, published Sep. 26, 2013, filed Mar. 21, 2012, and entitled "Motorized Exoskeleton Unit;"

US Patent Publication No. 2014/0005577, published Jan. 2, 2014, filed Jun. 28, 2012, and entitled "Airbag for Exoskeleton Device;"

US Patent Publication No. 2014/0196757, published Jul. 17, 2014, filed Jan. 17, 2013, and entitled "Gait Device with a Crutch;"

PCT International Patent Application No. PCT/IL2016/050723, filed Jul. 6, 2016, and entitled "Method and Apparatuses for Exoskeleton Attachment;"

PCT International Patent Application No. PCT/IL2016/051125, filed Oct. 16, 2016, and entitled "Apparatus and Systems for Controlling Exoskeletons;"

PCT International Patent Application No. PCT/IL2016/051296, filed Dec. 4, 2016, and entitled "Apparatus and Systems for Powering Supports for Exoskeletons;" and PCT International Patent Application No. PCT/IL2017/050453, filed Apr. 13, 2017, and entitled "Apparatus and Systems for Graceful Collapse of an Exoskeleton."

In some embodiments, the exoskeleton 100 may be used by a user to maintain gait as well as to transition between sitting and standing positions. During transitions between sitting and standing positions, however, significant amount of pressure or stress may be applied on the limbs of the user and the various components and joints of the exoskeleton 100. For example, during a transition from sitting to standing, a user's upper body may push against the pelvic structure of the exoskeleton 100 while the weight of the user is supported by the ABKS on the other side. Depending on the amount of support from the ABKS, which may also depend on the weight of the user, there may be a significant amount of pressure on the bones of the user that may be uncomfortable or even detrimental to the well-being of the user. For example, such pressures may result in the fracturing of the bones. Accordingly, in some embodiments, a safety mechanism is provided that monitors and regulates the amount of pressure or stress that is exerted on the limbs of the user. For example, the safety mechanism may provide warnings when bone pressures start becoming excessive so that the user and/or exoskeleton may adjust so as to avoid the excessive pressure. In such context, excessive may mean that the bone pressures are within about 25%, about 20%, about 15%, about 10%, about 5%, about 1%, about equal to, and exceeds a threshold of the exoskeleton (threshold above which the transition between sitting and standing up may be interrupted or modified). In some embodiments, the safety mechanism may trigger a controlled collapse mode where the exoskeleton 100 interrupts the transition to the standing position and safely returns the user to a sitting position.

Figure 2:
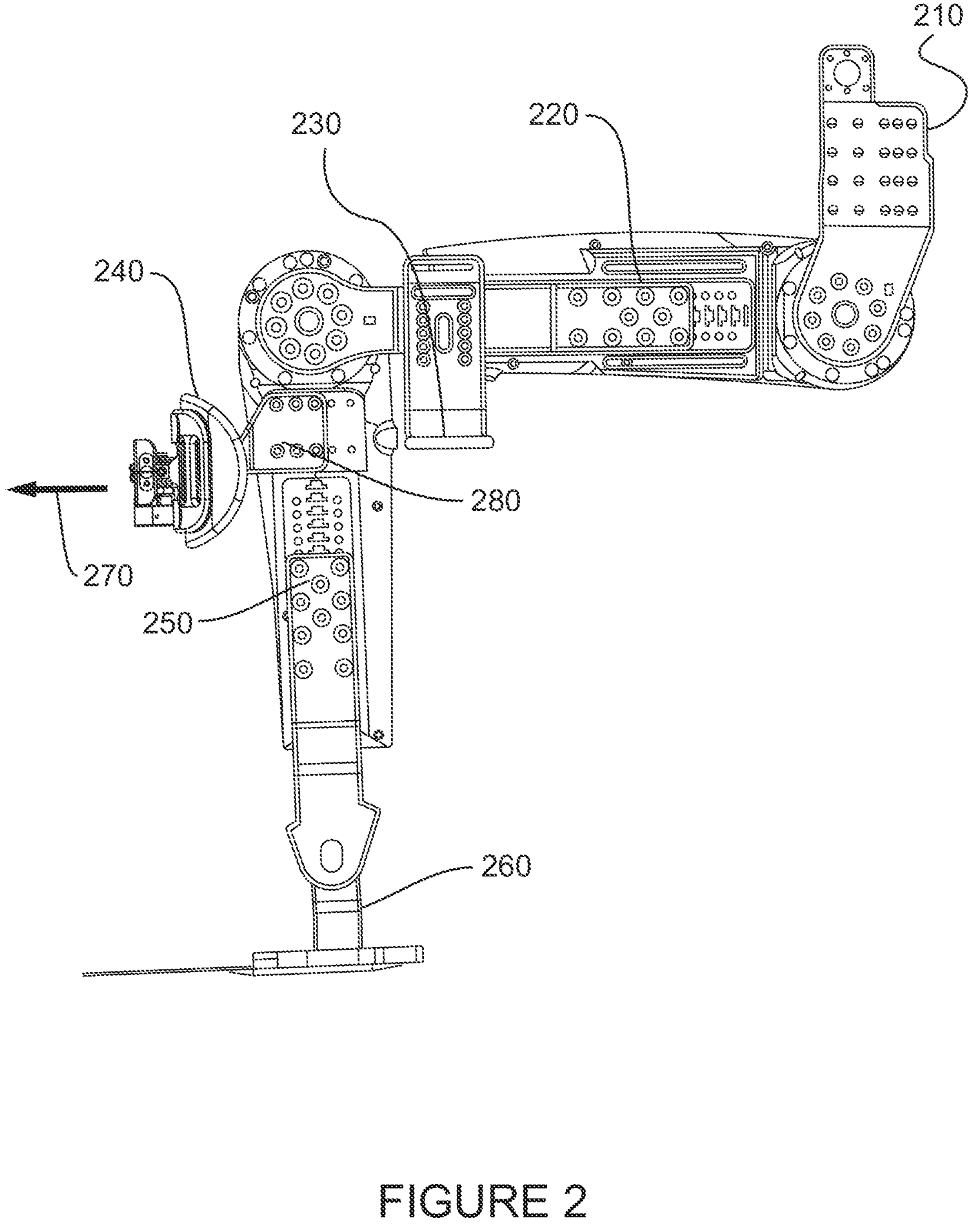
FIG. 2 shows example illustration of a leg of an exoskeleton device, according to some embodiments.

In some embodiments, with reference to FIG. 2, the exoskeleton 100 may include sensors that are configured to detect and measure the stress that may occur at the contact points between the limbs of a user and the exoskeleton 100 and/or straps that secure the user to the exoskeleton. For example, such strain sensors or gauges may be located at the user support locations such as the pelvic support (and connections 210 to the pelvic support), the upper limb support 220, the above knee bracket or support 230, the lower limb support 250, the foot plate 260, and/or the like.

Figure 3A:
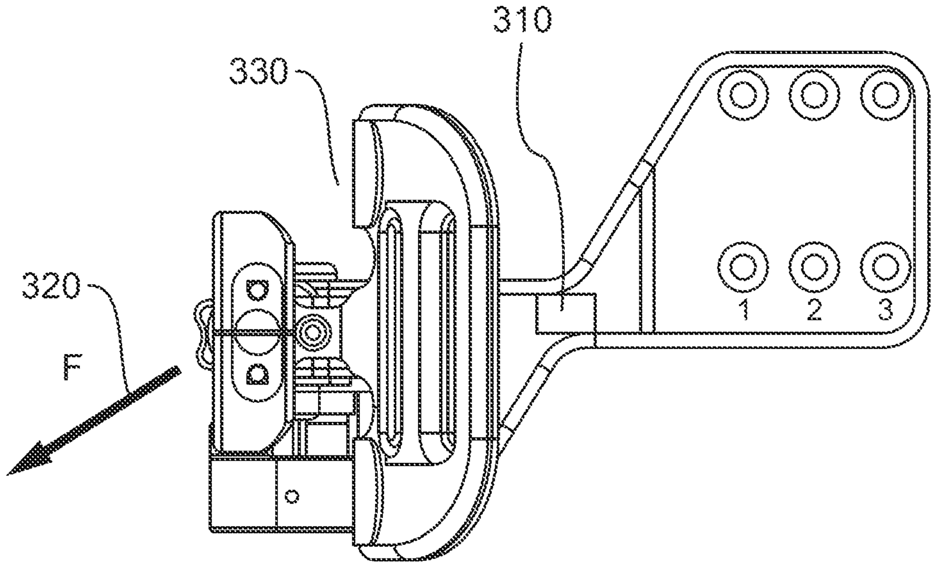
FIG. 3A shows example illustration of the anterior below knee support (ABKS) of an exoskeleton device, according to some embodiments.

The sensors may also be located at the straps securing the user to the legs of the exoskeleton, such as, with reference to FIG. 1, the thigh strap 4, shoulder strap 13, the chest and back straps, etc. In some embodiments, a strain sensor or gauge may be located at the front knee bracket or the ABKS 240. When a user is seated (FIG. 2), in some embodiments, a strain sensor 280 located at the ABKS 240 may detect and measure a load or pressure 270 exerted onto the bracket which, at equilibrium, may be substantially equal to the stress exerted back on the user's leg (hence, bones). The contribution to the pressure or load 270 from the user's weight may not be significant in the seated position, since the user's weight is substantially vertical and the pressure 270 is horizontal. However, as the user transitions from a sitting position to a standing up position, in some embodiments, there is a non-zero component of the user's weight that is aligned along the length of the user's upper limb. In other words, with reference to FIG. 3A, in some embodiments, the user's weight contributes to the load 320 that is exerted onto the ABKS 330 (which again may correspond to the force exerted back onto the user's legs). In some embodiments, there may be additional sensors located on the ABKS 330 (or in its vicinity) that provide additional data so as to facilitate in the determination of the pressure that is being applied on the user's legs or bones. For example, a tilt or an angle sensor (not shown) may be provided that can measure the knee bend angle $\alpha$ of the upper limb/upper limb support.

Figure 3B:
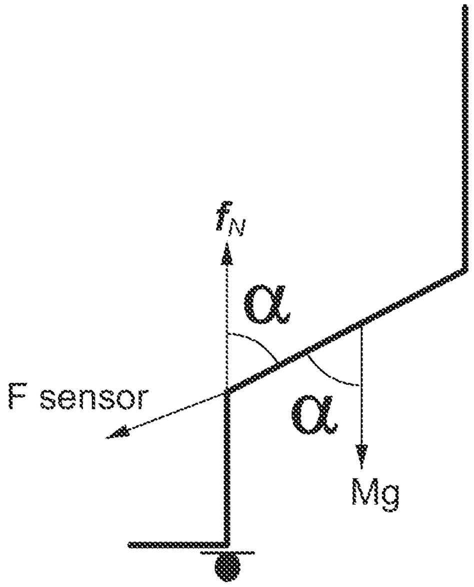
FIG. 3B shows the free body diagram of the forces exerted on the ABKS of the exoskeleton device, according to some embodiments.

FIG. 3B shows the free body diagram of the forces that occur when a user of the exoskeleton is transitioning between a sitting position and a standing position, or vice versa. As the user/exoskeleton is rising up, in some embodiments, the upper limb of the user (equivalently, the upper limb support of the exoskeleton) may be oriented so as to make an angle $\alpha$ with the vertical. The weight of the user Mg points down vertically, as such, the component of the weight that points along the upper limb of the user can be expressed as Mg $\cos(\alpha)$. The ground also provides a frictional force $f_N$ that pushes against the bottom of the foot plate of the exoskeleton when the foot plate pushes on the ground in the process of standing up. Here again, the component of the frictional force that may be oriented along the direction of the upper limb or the upper limb support may be given by $-f_N \cos(\alpha)$, where $f_N$ is the vertical normal force applied by the ground to the foot plate of the exoskeleton (the negative sign indicates that the direction of the component is opposite to the direction of the component of the weight). Accordingly, a strain sensor or gauge located on the ABKS 330 (e.g., located at 310) may measure a load or force 320 $F_{sensor}$ that corresponds to the difference between the weight component and the friction component. For example, $F_{sensor}$ may be equal to or substantially equal to $0.5(Mg \cos(\alpha)-f_N \cos(\alpha))$. In some embodiments, the return force that the ABKS exerts back on the leg of the user when supporting the user may be equal to or substantially equal to $F_{sensor}=0.5(Mg \cos(\alpha)-f_N \cos(\alpha))$. In some embodiments, the load or force 320 may not be balanced between the left and right legs of a user, and in such instances, the $F_{sensor}$, as measured by different sensors on the left and right legs may be different. For example, the sensor on one of the legs may detect a load or force 320 of $F_{sensor}=\beta(Mg \cos(\alpha)-f_N \cos(\alpha))$, where $\beta$ may range from about 0 to about 1, while the sensor on the other leg may detect a load or force 320 of $F_{sensor}=(1-\beta)(Mg \cos(\alpha)-f_N \cos(\alpha))$.

In some embodiments, there may be a desire to limit the magnitude of $F_{sensor}$ as the force or pressure that the ABKS applies back on the user's leg (and as such to the leg bones) is same as or at least substantially same as $F_{sensor}$. In other words, so as to avoid discomfort or even health risks such as bone fractures, one may wish to limit or minimize the force that the sensor measures and that is also exerted on the legs of the user.

In some embodiments, the strain sensor or gauge and/or other additional sensors (such as the sensors measuring orientation, tilt, etc.) of the exoskeleton may transmit the data collected by the sensors to a processing unit of the controller pack of the exoskeleton and/or an external processing unit that is operably coupled to the exoskeleton. For example, the sensors may gather data on the weight of the user, the knee bend angle $\alpha$, the normal force $f_N$ (e.g., as measured by a sensor located at the foot plate of the exoskeleton), etc., and transmit at least these data to the noted processing units. The transmission may take place via a communications component that is configured to establish communication between the sensors and processing units disposed in the controller pack and/or external to the exoskeleton. The processing units, in some embodiments, may then determine the net force applied at the contact points of the user limbs and the exoskeleton components, such as the ABKS 330, as discussed above (for example). In some embodiments, the sensors may have at least some processing capability to calculate the applied net force, and transmit the results of the calculations to the processing units. The processing unit may then determine if whether the load or pressure on the user's limbs are approaching or exceeding a threshold, and if so whether to generate and provide a warning to the user/exoskeleton to adjust appropriately to reduce the excessive force. The warning may be in the form of a display on a user interface, or it may be an audio warning. In some embodiments, based on the sensor measurements, calculated results, and/or a feedback from the user/exoskeleton, the processing unit may trigger a graceful or controlled collapse mode where the transition of the exoskeleton from the sitting position to the standing position is interrupted and the exoskeleton is safely returned to a stable position (e.g., lowered to the ground).

In some embodiments, the threshold used by a processing unit for determining whether a force or load is excessive may be static or dynamic. For example, the threshold may be a static value such as a fixed force (e.g., 100 lbs, etc.) or it may be a fraction of the user's weight. For example, the threshold may be about 25%, about 35%, about 45%, about half, about 75%, etc., of the user's weight. As an illustrative example, the threshold may be about half of the user's weight, and when the net force detected by the sensor, $F_{sensor}=0.5(Mg \cos(\alpha)-f_N \cos(\alpha))$, exceeds this threshold (i.e., when $F_{sensor}$ exceeds about 0.5 Mg $\cos(\alpha)$), the processing units may generate and transmit a warning or trigger a controlled collapse mode as discussed above. In some embodiments, the threshold may be dynamic, i.e., the threshold value may be adjustable while in use either by the user and/or by the processing units. For example, the user may provide an input through a user interface so as to increase or decrease the threshold, which may then be transmitted by the user interface to the processing units. In some embodiments, the user may have the option of overriding the warnings altogether (whether adjusting or not the threshold). In some embodiments, the processing units may adjust the threshold based on the measurements of the sensors, input received from a user or others, the progress or status of the transition between the sitting and standing positions, etc. For example, if a processing unit determines that the knee bend angle $\alpha$ is almost zero (indicating that the user is almost upright) when $F_{sensor}$ exceeds a threshold, the processing unit may adjust (e.g., increase) the threshold (temporarily or permanently) to allow the user to become fully upright without triggering a graceful collapse mode of the exoskeleton. In such embodiments, the processing unit may still provide a warning to the user.

In some embodiments, when the processing unit determines that $F_{sensor}$ has exceeded a threshold, it may generate and transmit an instruction to the exoskeleton to enter a collapse mode. In some embodiments, the collapse mode may be a graceful or controlled collapse mode, where the exoskeleton transitions out of its current state (e.g., rising up to a standing position) and enters into a stable "graceful collapse" mode in a safe manner. Controlled or graceful collapse mode allows an exoskeleton device to support a user's weight while slowly lowering the user to a seat or the ground so as to place the user in a stable and safe environment. Various aspects of the graceful collapse mode of an exoskeleton device have been described in PCT International Patent Application No. PCT/IL2017/050453, filed Apr. 13, 2017, entitled "Apparatus and Systems for Graceful Collapse of an Exoskeleton," which is incorporated by reference herein in its entirety.

Various implementations of some of embodiments disclosed, in particular at least some of the processes discussed (or portions thereof), may be realized in digital electronic circuitry, integrated circuitry, specially configured ASICs (application specific integrated circuits), computer hardware, firmware, software, and/or combinations thereof. These various implementations, such as associated with the controller 254, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smart-phone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

The components of the system may be interconnected by any form or medium of digital data communication (e.g., a communication network). Examples of communication networks include a local area network ("LAN"), a wide area network ("WAN"), and the Internet. The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to translocation control. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure). Also within the scope of some of the embodiments of the present disclosure is the specific lack of one or more features that may be present in the prior art. In such embodiments, patentable claims may include negative limitation to indicate such lack of one or more features taught in the prior art in, for example, any one or more of certain disclosed apparatuses, systems, and methods.

The invention claimed is:

1. A safety system for regulating a load amount applied on one or more limbs of a user of an exoskeleton, the system comprising:

a processing unit;

one or more sensors for sensing force data, including data related to an amount of force exerted on one or more limbs of the user by a part of the exoskeleton; and a communications component for transmitting the sensed data to the processing unit operably coupled to the exoskeleton, wherein:

the processing unit is configured to monitor and process the data so as to determine the amount of exerted force on the one or more limbs, upon the determined amount of exerted force on the one or more limbs being within a specified amount of, equal to, or greater than a predetermined threshold, the processing unit generates a notification warning to the user to adjust to reduce the exerted force, upon the exerted force not being reduced below the predetermined threshold, the processing unit generates a controlled collapse mode of operation of the exoskeleton such that the exoskeleton is lowered to a seated or ground position, so as to not cause damage to the one or more limbs, and the notification warning is generated if the determined amount of force on the one or more limbs is between 1% and 5% of the predetermined threshold.

2. The system of claim 1, wherein the one or more sensors include a sensor configured to measure an angle formed at a knee of the exoskeleton.

3. The system of claim 1, wherein the part of the exoskeleton is an anterior below knee support (ABKS) of the exoskeleton configured to provide support to a lower limb of a leg of the user.

4. The system of claim 1, wherein the predetermined threshold is dependent upon a weight of the user.

5. The system of claim 1, further comprising a user interface configured to provide the notification warning.

6. A safety method for regulating a load amount applied on one or more limbs of a user of an exoskeleton, the method comprising:

receiving, from one or more force sensors, data related to an amount of force exerted on one or more limbs of the user by a part of the exoskeleton;

processing the data via a processing unit so as to determine the amount of force exerted on the one or more limbs of the user;

upon the determined amount of exerted force on the one or more limbs being within a specified amount of, equal to, or greater than, a predetermined threshold, generating by the processing unit a notification warning to the user to adjust to reduce the exerted force, and upon the exerted force not being reduced below the predetermined threshold, the processing unit generates a controlled collapse mode of operation of the exoskeleton such that the exoskeleton is lowered to a seated or ground position, so as to not cause damage to the one or more limbs, wherein the notification warning is generated if the determined amount of force on the one or more limbs is between 1% and 5% of the predetermined threshold.

7. The method of claim 6, wherein the data includes frictional force between a foot plate of the exoskeleton and a ground.

8. A safety system for regulating a load amount applied on one or more limbs of a user of an exoskeleton, the system comprising:

a processing unit;

one or more sensors for sensing data, including force data related to an amount of force exerted on one or more limbs of the user by a part of the exoskeleton; and a communications component for transmitting the sensed data to the processing unit operably coupled to the exoskeleton, wherein:

the one or more sensors include a knee-angle sensor configured to measure and provide angle data of an angle formed at a knee of the exoskeleton during the transition between seating and standing positions, the processing unit is configured to monitor and process the force data so as to determine the amount of exerted force on the one or more limbs, upon the determined amount of exerted force on the one or more limbs being within a specified amount of, equal to, or greater than a predetermined threshold, the processing unit generates a notification warning to the user to adjust to reduce the exerted force, and upon the exerted force not being reduced below the predetermined threshold, the processing unit generates a controlled collapse mode of operation of the exoskeleton such that the exoskeleton is lowered to a seated or ground position, so as to not cause damage to the one or more limbs.

9. The safety system of claim 8, wherein the notification warning is generated if the determined amount of force on the one or more limbs is between 1% and 5% of the predetermined threshold.

10. The safety system of claim 8, wherein the processing unit is configured to monitor and process the force data and the angle data so as to determine the amount of exerted force on the one or more limbs.

* * * * *